United States Patent [19]
Schaffner
[11] 3,748,499
[45] July 24, 1973

[54] VOLTAGE VARIABLE NON-INDUCTION PHASE SHIFTER WITH MONOLITHIC IMPLEMENTATION

[75] Inventor: Gerald Schaffner, La Mesa, Calif.
[73] Assignee: Teledyne Ryan Aeronautical, Division of Teledyne Industries, Inc., San Diego, Calif.

[22] Filed: Dec. 20, 1971
[21] Appl. No.: 209,529

[52] U.S. Cl. .................. 307/295, 307/320, 307/303, 317/234 R
[51] Int. Cl. .................. H03k 3/35
[58] Field of Search .................. 307/303, 320, 295; 317/235 F, 234 UA, 234 R

[56] References Cited

UNITED STATES PATENTS

| | | | |
|---|---|---|---|
| 2,981,877 | 4/1961 | Noyce | 317/235 F |
| 3,191,130 | 6/1965 | Rudd et al. | 307/320 |
| 3,238,528 | 3/1966 | Hines | 307/320 |
| 3,384,829 | 5/1968 | Sato | 307/320 |
| 3,555,374 | 1/1971 | Usuda | 317/235 F |

*Primary Examiner*—John S. Heyman
*Attorney*—Carl R. Brown et al.

[57] ABSTRACT

A voltage variable RC phase shifter incorporating reverse bias P-N junctions functioning as voltage variable capacitors in conjunction with resistance elements to produce a phase shift variation up to a maximum of 90°. The degree of phase shift over that range is controlled by controlling the DC reverse bias. The fact that the phase shifter does not require inductances makes it possible to produce a monolithic implementation of the circuit. According to the invention, this implementation makes the use of double diffusion in the semiconductor layers to produce a hyper-abrupt junction and results in the capability of producing a relatively large change in capacitance with a small change in the bias potential.

4 Claims, 3 Drawing Figures

INVENTOR.
GERALD SCHAFFNER
BY Brown & Martin
ATTORNEYS

VOLTAGE VARIABLE NON-INDUCTION PHASE SHIFTER WITH MONOLITHIC IMPLEMENTATION

BACKGROUND OF THE INVENTION

Phase shifting circuits are of fundamental imporatnce to many electronic devices including, for example, phased array systems. Phase shifters according to prior art designs have normally required the use of circuits employing inductive elements. These circuits are expensive and must be built up element by element since it is not possible to implement an inductor into an monolithic or similar circuit. Further, the inductors themselves are expensive, adding to the overall circuit cost.

Other prior art phase shifters have been developed to utilize digital techniques in obtaining the phase shift. Digital phase shifters are even more expensive than the inductive phase circuits but do have the advantage of being mathematically predictable and are susceptible to monolithic implementation and batch processing.

None of the prior art phase shifters satisfy the dual requirements of economy and small size, and therefore it would be desirable if such a circuit could be developed, particularly if such a circuit would be susceptible to a monolithic implementation capable of being produced at low cost in high quantities.

SUMMARY OF THE INVENTION

The circuit of the invention uses voltage variable capacitors (V.V.C.'s) in an RC network to produce a variable phase shift, by varying the quantity of a DC bias. The voltage variable capacitor may advantageously be a reversed biased P-N junction and may be utilized in series with the signal path or shunted to ground. In either application, the V.V.C.'s are utilized in conjunction with resistors to provide requisite voltage drop on which the capacitor operates. The circuit resulting from the application of the techniques of the invention prodcues a predictable phase shift, and the amount of phase shift obtainable varies from between 0° and 90°. All the components utilized are readily available at relatively low cost, resulting in a low overall cost. The pure resistive-capacitive nature of the circuit utilizing the invention, makes it possible to implement the circuit in a monolithic device. The monolithic circuit may be made up to include both the P-N junctions and the resistive elements, as well as the insulation between, and connections between, the various elements. The effectivenss of the circuit is enhanced in the monolithic implementation by incorporating a hyper-abrupt junction utilizing double diffusion, and thereby obtaining a $\alpha$ coefficient in excess of what could be obtained utilizing only a single diffusion. When produced in high quantities, this monolithic implementation is extremely low in cost and may be effectively employed where multiply phase shifters are required.

It is therefore an object of the invention to provide a new and improved voltage variable non-inductive phase shifter.

It is another object of the invention to provide a new and improved monolithic implementation for voltage variable non-inductive phase shifters.

It is another object of the invention to provide a new and improved phase shifter which is low in cost.

It is another object of the invention to provide a new and improved phase shifter that produces a mathematically predictable phase shift.

It is another object of the invention to provide a new and improved voltage variable phase shifter with a large tuning ratio.

It is another object of the invention to provide a new and improved voltage variable phase shifter using hyper-abrupt junctions.

Other objects and many attendant advantages of the invetion will become more apparent upon a reading of the following detailed description together with the drawings in which like reference numerals refer to like parts throughout and in which.

Figure 1:
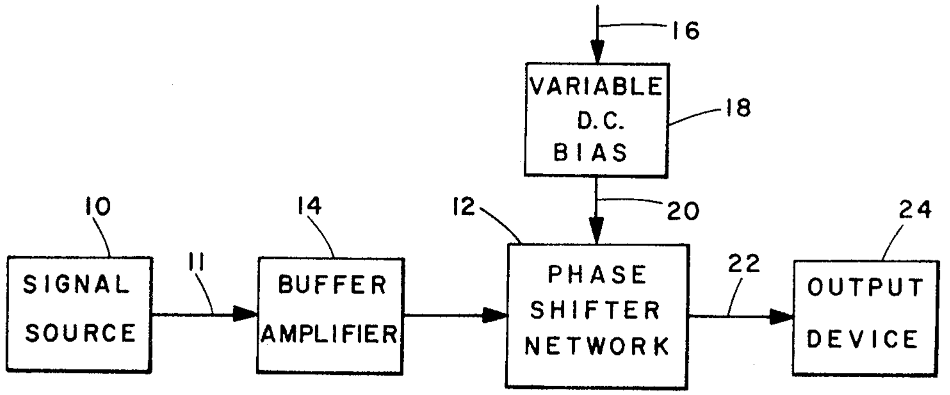
FIG. 1 is a block diagram of a typical circuit employing the phase shifter.

Referring now to the drawings, there is illustrated in FIG. 1, a block diagram illustrating the system of the invention. A signal source 10 inputs the RC phase shifter of the invention 12, through a buffering amplifier 14. The amount of phase shift is controlled by a control signal on line 16, controlling the output of a variable DC bias source 18. Th bias source inputs the phase shifter through line 20. The phase shifted signal appears on line 22 and is connected to the output device 24.

Figure 2:
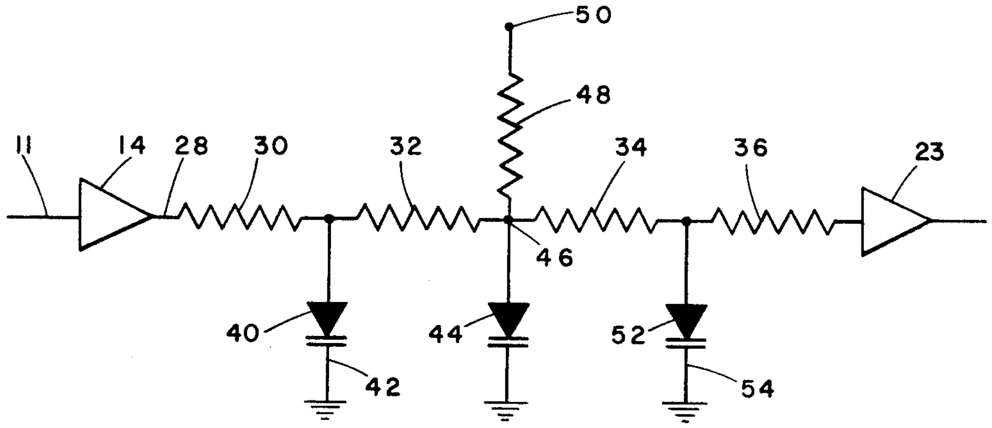
FIG. 2 is a schematic diagram of the phase shifter circuit.

Referring now to FIG. 2, there is illustrated an exemplary circuit embodying the principals of the invention. The input signals appear on line 11 and are connected to the buffering amplifier 14 which isolates the circuit from adjacent circuit components. The output of this amplifier is connected by line 28 to resistor 30. Resistor 30 is connected in series relationship with resistors 32, 34 and 36. The output of the system appearing on resistor 36 is connected to an output buffering amplifier 23. The phase shifter is illustrated as comprising three stages, each stage employing a voltage variable capacitor. The first voltage variable capacitor 40 is connected between resistors 32 and 30 and is connected to ground through line 42. The second stage uses voltage variable capacitor 44 connected between resistors 32 and 34 at connection 46. Connection 46 also is connected to a resistor 48. Resistor 48 receives the output of the variable DC bias source 18 on connection 50.

The third voltage variable capacitor stage employs a reverse bias P-N diode 52 connected between resistors 34 and 36, and having its N end connected to ground through wire 54.

Thus, a DC negative bias appearing on pin 50 is connected to the P-N junctions to reverse bias those junctions and effect their capacitance. The input signal therefore sees a plurality of RC networks each of which produces a phase shift predictable from the following formula:

$$C=\frac{C_0}{\left(1+\frac{V\text{ reverse}}{\phi}\right)}\alpha$$

Where $C$ is the junction capacitance $C_o$ is the zero bias capacitance $V$ reverse is the applied reverse bias voltage $\phi$ = Contact potential
= 0.4 depending on variation of N doping level with depth.

Figure 3:
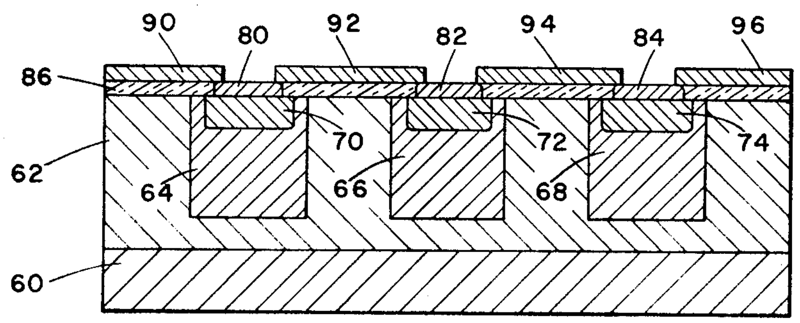
FIG. 3 is a sectional view showing the monolithic structure of the phase shifter.

Referring now to FIG. 3, there is illustrated a monolithic implementation of the invention. The circuit is built up on a heavily doped N + substrate 60 which acts as a ground plane. A second lightly doped epitaxially grown layer 62 is deposited on the substrate 60. The resistivity of this layer is approximately 20 ohms per square and comprises a first diffiusion which will be utilized in the development of hyper-abrupt P-N junctions. Next an N diffusion is made at the intended location for each P-N junction. In the instant emobidment M diffusions are made at 64, 66 and 68. Finally a P + diffusion is made on the N diffusion for each P-N junction. P junction 70 is diffused through N diffusion 64, P diffusion 72 is diffused through N diffusion 66, and P diffusion 74 is diffused through N diffusion 68. Contact to the P + junction is accomplished by thin film metalization. The metalization contacting P deposition 70 is at numeral 80. The contact 82 contacts P diffusion 72, and contact 84 contacts P diffusion 74. The remaining area of the uper surface layer substrate is covered with an insulative layer 86. The resistors corresponding to resistors 32, 34 and 36 are formed by depositing thin film resistor material such as Nichrome, up to, and overlaying the edge of the contacts 80, 8 and 84. Thus the resistor 30 is formed by thin film resistor 90, the resistor 32 by thin film resistor 92, the resistor 34 by thin film resistor 94, and the resistor 36 by thin film resistor 96. Resistor 48 may be a discrete component or may be deposited elsewhere on the circuit and connected by wire bonding or other conventional techniques.

The double diffusion utilized in developing the P-N junctions is effective to produce a much higher value for $\alpha$ than is possible with conventional techniques. $\alpha$ values as high as 0.7 are possible with this technique giving the circuit a much larger tuning ratio and therefore making the circuit very responsive to small voltage changes.

It is to be understood that a similar monolithic implementation could be made for a circuit utilizing voltage variable capacitors in series with resistor shunts to ground.

Having described my invention, I now claim.

1. A monolithic, non-inductive ladder-type phase shifter comprising:
- a body portion including a semi-conductor substrate,
- a first lightly doped layer on said substrate,
- a plurality of areas on said first layer having an N diffusion,
- a portion of each of said N dIffusions having a P+ diffusion to produce a plurality of double diffused semi-conductor junctions,
- signal means for supplying an AC signal,
- resistive means deposited on said body for providing a resistive load to said junctions and a voltage drop on said signal,
- and bias means for varying the capacitance of said junctions and inducing a phase shift in said AC signal,
- said junctions being connected to sum the total of the individual phase shifts for each junction.

2. The monolithic phase shifter of claim 1 wherein, said bias means comprises a source of variable voltage DC.

3. The monolithic phase shifter of claim 1 wherein:
- said resistive means contacts said junction through a metalization layer.

4. The monolithic phase shifter of claim 1 wherein:
- an insulating layer is laid over portions of said first layer;
- and said resistive means is deposited on said insulating layer.

* * * * *